(12) United States Patent
Ryland

(10) Patent No.: US 10,121,026 B1
(45) Date of Patent: Nov. 6, 2018

(54) SECURE ENCLOSURE SYSTEMS IN A PROVIDER NETWORK

(71) Applicant: AMAZON TECHNOLOGIES, INC., Seattle, WA (US)

(72) Inventor: Mark Ryland, Great Falls, VA (US)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 14/986,051

(22) Filed: Dec. 31, 2015

(51) Int. Cl.
*G06F 21/70* (2013.01)
*H05K 7/14* (2006.01)

(52) U.S. Cl.
CPC .......... *G06F 21/70* (2013.01); *H05K 7/1492* (2013.01); *H05K 7/1497* (2013.01); *H05K 7/1498* (2013.01)

(58) Field of Classification Search
CPC .... G06F 21/70; H05K 7/1492; H05K 7/1497; H05K 7/1498
See application file for complete search history.

(56) References Cited

U.S. PATENT DOCUMENTS

| | | | | | |
|---|---|---|---|---|---|
| 4,197,675 | A | * | 4/1980 | Kelly | E05F 15/72 340/634 |
| 4,686,912 | A | * | 8/1987 | Fogleman | E05B 47/0603 109/59 T |
| 5,752,697 | A | * | 5/1998 | Mandel | B65H 39/10 270/58.18 |
| 8,176,550 | B2 | * | 5/2012 | Kishi | G06F 21/31 705/5 |
| 8,528,101 | B1 | | 9/2013 | Miller et al. | |
| 8,539,556 | B1 | | 9/2013 | Brandwine | |
| 8,584,228 | B1 | | 11/2013 | Brandwine et al. | |
| 2009/0187775 | A1 | * | 7/2009 | Ishikawa | G06F 1/3203 713/310 |
| 2011/0128145 | A1 | * | 6/2011 | Todd | G06F 19/3418 340/539.11 |
| 2014/0088979 | A1 | * | 3/2014 | Garman | G06Q 10/0631 705/1.1 |
| 2014/0193294 | A1 | * | 7/2014 | Kain | A61L 2/24 422/3 |
| 2015/0052930 | A1 | * | 2/2015 | Byrne | F25D 3/102 62/314 |
| 2015/0379277 | A1 | * | 12/2015 | Thota | G09C 1/00 713/189 |
| 2016/0105840 | A1 | * | 4/2016 | Smiley | H04W 48/04 455/418 |
| 2017/0269128 | A1 | * | 9/2017 | Bugaris | G01R 19/155 |

* cited by examiner

*Primary Examiner* — Lynn D Feild
*Assistant Examiner* — Abdullah Almamun
(74) *Attorney, Agent, or Firm* — Blank Rome LLP

(57) ABSTRACT

A secure containment enclosure such as an equipment rack is disclosed that includes an electronic locking system. The electronic locking system locks and, upon receipt of a valid credential to a credential input device, unlocks an access door to the secure containment enclosure. The electronic locking system locks the access door during normal operation, and is prevented from unlocking the access door during normal operation and for a predetermined period of time after the secure containment enclosure is powered off to ensure that all data on electronic devices in the secure containment enclosure is erased. Other security features include storage encryption, network encryption, preventing administrative logon access to customers' compute nodes, and dedicated instances in which only virtual machines from specified customer accounts can be located on the same electronic device.

20 Claims, 6 Drawing Sheets

SECURE ENCLOSURE SYSTEMS IN A PROVIDER NETWORK

BACKGROUND

Networks interconnecting large numbers of compute resources have become ubiquitous. Data centers, for example, have been created in which thousands of servers are housed and maintained. In some cases, service providers have large networks of servers, storage devices and other support infrastructure for use by their customers, thereby alleviating the customers from having to own and operate their own hardware. Customers of the service provider can interact with the service provider's network through applications programming interfaces (APIs) or a graphical user interface or other interfacing modality to create and manage virtual machine instances on which the customers can load their own customer-specific applications.

The advent of virtualization technologies for commodity hardware advantageously permits the service provider to create "virtual machine instances" on the physical computers and permit customers exclusive use of such instances. To the customer, the virtual machine instance is accessible in much the same as a physical computer. Virtualization technologies such as the use of hypervisors enable multiple virtual machine instances to be executed on a common server computer. It is even possible that one server computer can execute virtual machine instances belonging to disparate customers.

The possibility that different customers' virtual machine instances may be launched on the same physical server computer may create security worries on behalf of the customers. However, the virtualization technologies are such that each virtual machine instance can be logically isolated from another virtual machine instances running on the same physical server computer. Thus, the possibility for data leakage or other kinds of cross-contamination between virtual machine instances can be reduced nearly to zero. Nevertheless, no software is provably free of all flaws, so security concerns may remain.

BRIEF DESCRIPTION OF THE DRAWINGS

For a detailed description of various examples, reference will now be made to the accompanying drawings in which.

DETAILED DESCRIPTION

Figure 1:
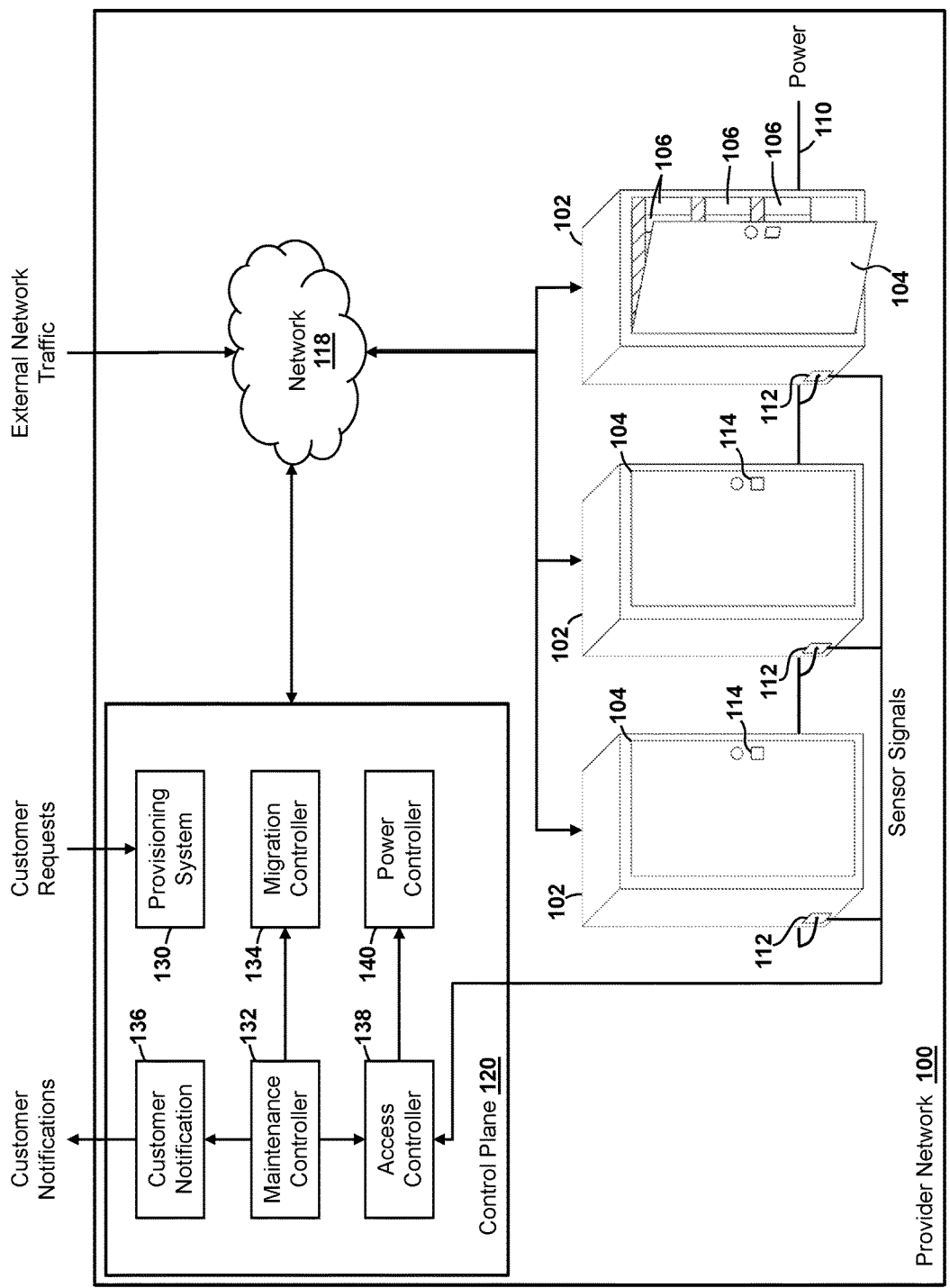
FIG. 1 shows a system in accordance with various examples.

Various embodiments are described of methods and apparatus for increasing security in a network such as a multi-customer service provider network. In one embodiment, the provider network includes one or more data centers, and each data center includes one or more equipment racks in which computing devices such as server computers, storage devices, and the like can be housed. Each rack has an access door and with the access door in a locked state, a human cannot physically access (e.g., touch, connect a cable, etc.) the computing devices behind the access door. Each access door can be locked with an electronically-controlled lock. The lock may be implemented, for example, as a magnetic lock that also includes an access interface. The access interface permits a human to provide a credential which, if determined to be valid, unlocks the electronically-controlled lock. In such embodiments, the electronically-controlled lock has its access interface disabled while one or more computing devices in the rack are still powered on. Further, the access interface to the electronically-controlled lock remains disabled even after all computing devices in the rack are powered off for a predetermined period of time.

In one example, the service provider determines that a maintenance action should be performed on a particular equipment rack (e.g., to replace a server in the rack, to retire all of the servers in the rack, etc.). The service provider initiates a power down process for the computing devices in the rack, which may include informing customers that their virtual machine instances executing in the rack are going to be shut down, migrating virtual machines from the rack to another rack, and powering down individual computing devices within the rack. A lock access controller in the provider network may receive a signal indicative of each virtual machine and/or each computing device being shut down and powered off. When the last of the computing devices within the rack indicates that it is shutting down, or has been shut down, the lock access controller starts a counter that counts for the predetermined period of time (e.g., 5 minutes, 10 minutes, 15 minutes, 1 hour, etc.). The period of time may be determined apriori based on testing of the particular type of storage devices used in the computing devices. The testing may determine the minimum amount of time that volatile storage device may have its power turned off, yet upon subsequent access by whatever means, none of the contents of the volatile storage can be recovered. Upon expiration of the predetermined period of time, the lock access controller sends a command to the electronically-controlled lock in the rack to thereby enable the lock's ability to receive a credential from a human. The human then can present a valid credential (e.g., a valid personal identifier number or password on a keypad, biometric verification such as a valid fingerprint, a magnetic card, etc.). The lock verifies the credential and if the credential is determined to be valid, the lock unlocks and the access door to the equipment rack can be opened. In another embodiment, each electronically-controlled lock is configured to authenticate a credential and to request the access controller to permit the electronically-controlled lock to unlock the access door. The access controller in this embodiment will deny the request to unlock the access door even upon receipt by the electronically-controlled lock of a valid credential during normal rack operation as well as for a predetermined period of time following powering down of the rack. Upon expiration of the predetermined period of time, the access controller may grant a request from the electronically-controlled lock to unlock the access door upon receipt by the lock of a valid credential.

Other forms of heightened security are provided as well. For example, some embodiments support "dedicated instances" in which a customer of a service provider can be assured of single tenancy of that customer's virtual machine instances on a server computer. That is, a customer requesting dedicated instances will have the customer's requested virtual machine instances placed on a server computer that does not and will not execute other customers' virtual machine instances. In some embodiments, customers who use a multi-account strategy (e.g., multiple service provider accounts for the same customer) can request the service provider network to provision dedicated instances across the various accounts of the same customer. In such embodiments, the same server computer can host virtual machines of two or more of the same customer's accounts with no other virtual machine instances belonging to other customers permitted to be hosted on that particular server computer. Through single tenancy in a server computer of a customer's virtual machine instances, the potential is eliminated for one customer's virtual machine instances to access another customer's virtual machine instances through common hardware or software resources on the same physical server computer. In other embodiments, in addition to a single customer using multiple accounts with shared placement of instances, placement of virtual machines on particular physical machines can extend beyond a single customer to allow a group of customers who trust each other to have their virtual machine instances located only on hardware utilized by other members of the trusted group.

In addition to single tenancy in a server computer of a customer's virtual machine instances, the service provider's administrative logon access to the server computer on which a customer's virtual machine instance(s) is being hosted may be deactivated or non-existent. That is, there may be no interactive access for administrator logon. For example, when a customer accesses the service provider network to create virtual machine instances, the customer can request the virtual machine instances to be hosted on a server computer for which no administrator access is permitted. In some embodiments, administrator access to a virtualization system (e.g., hypervisor, DOMO in the case of the XEN hypervisor, etc.) executing on the server computer is disabled, while in other embodiments, the hypervisor has no separate administrator logon capability. As such, the service provider network specialists and other staff cannot log on to the server computer on which the customer's virtual machine instance is executing, thereby providing an additional level of security to those customers that want such security. Although the absence of administrator logon access may be desirable in a variety of embodiments, it may be particular useful in the context of dedicated instances in which only a single customer (or a group of customers who trust each other) is using the server computer.

In yet other embodiments, additional security is provided through the encryption of data on a storage disk (e.g., hard or solid state disk) used to implement, for example, block storage, as well as the encryption of packets being transferred through the service provider network. Disk encryption, for example, may be provided as a service upon request by the service provider's customers and, when activated, causes all accesses to block storage by a newly provisioned virtual machine instance throughout its lifetime to be encrypted. A storage volume can be created by a customer, attached to an instance, later detached and reattached to another of the customer's instances. The data stored on the volume can be encrypted. Data packets that flow through the network between instances also can be encrypted to provide additional security to the customers of the service provider. In some embodiments, a virtual overlay network may be implemented within the service provider's physical network and network traffic across the virtual overly network may be encrypted. Encryption keys are managed by a central mapping service and distributed to the various server computers to encrypt and decrypt the network traffic.

FIG. 1 illustrates an example of an embodiment of a provider network 100 of a service provider. The provider network permits customers of the service provider to use hardware and software compute resources on the provider network. In some embodiments, the provider network implements virtualization technologies which permit customers to reserve, create, use, manage, and retire virtual machine instances (sometimes also referred to as "instances" or "virtual machines"). A virtual machine is a virtualized computer system, or a software implementation of a physical computer system. Virtual machines may provide for multiple and/or different operating system environments to run concurrently on a single system having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system) which are programs that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines cannot disrupt each other. Each virtual machine may be controlled by different respective customers, who have access only to their own virtual machines and no access to the virtual machines of other customers.

The provider network 100 of FIG. 1 includes multiple equipment racks 102, and each equipment rack 102 can house multiple computing devices 106 (e.g., server computers). One or more of the computing devices 106 can host one or more virtual machines. The service provider may have any number of customers, and the number of computing devices 106 and the number of equipment racks 102 may be scaled as the size of the service provider's customer base grows. Consequentially, while three equipment racks 102 are shown in the example of FIG. 1, in general any number of equipment racks 102 (e.g., hundreds, thousands, etc.) and computing devices 106 are possible. The various equipment racks may be located in a data center controlled by the service provider.

The provider network 100 also may include a "control plane" 120 which provides management access and control of the various virtual machines and computing devices. The control plane in the example of FIG. 1 includes a provisioning system 130, a maintenance controller 132, a migration service 134, a customer notification service 136, an access controller 138, and a power controller 140, each of which may be implemented as a physical computer executing code to perform the functionality described herein attributed to the respective components of the control plane 120.

Customers may interact with the provisioning system 130 through graphical user interfaces, application program interfaces, command line interfaces, script files, etc. to submit requests to create and manage virtual machines. In response to a customer request to create a virtual machine, the provisioning system 130 determines on which physical computing device 106 to execute a virtual machine for the customer and causes the virtual machine to be launched. The provisioning system 130 may take into account a variety of factors when deciding where to place a virtual machine such as whether the customer wants an instance run in a rack that has an access door that remains locked until the computing devices are powered off, availability of the computing devices 106 to accept additional virtual machines, the type of virtual machine requested by a customer, the placement densities of the equipment racks 102 (e.g., it may be desirable for each rack 102 never to be more than a threshold percentage full of virtual machines), an availability zone specified by the customer (e.g., a location within a geographic region), etc.

Each equipment rack 102 receives electrical power through a power conductor 110. The power may be in the form of alternating current (AC) power or direct current (DC) power. In those embodiments in which the racks 102 receive AC power, a power supply may be provided to convert the incoming AC power to DC power to power the electrical components within each computing device 106. The power supply may be incorporated into each computing device (e.g., each server computer includes its own power supply), or the equipment rack itself may include standalone power supplies that convert AC power received into the rack into a DC voltage which is then distributed to each computing device 106. The computing devices 106 may include DC-to-DC converters to convert the received DC voltage to whatever DC voltage levels are needed by the computing devices.

Each equipment rack 102 also may include a power sensor 112. In some embodiments, the power sensor 112 detects the magnitude of electrical current flowing into the rack. In such embodiments, the power sensor 112 may be implemented as a low value resistor (e.g., 1 ohm) and the voltage generated across the resistor is a function of current. The power sensor 112 may include a network adapter (e.g., a wired or wireless adapter), the sensor itself such as the low value resistor, a battery, and a logic circuit (e.g., an application specific integrated circuit (ASIC). The logic circuit may monitor the voltage, current and/or power level and send a message to the control plane 120 (e.g., the access controller 138 or power controller 140) indicating the power level and/or a power level change as well as an identifier of the rack in which the power sensor is located. If all computing devices 106 in the rack are powered off, the power sensor's output signal will be equal to or less than a threshold level (e.g., 0). By monitoring the power sensor's output signal, a determination can be made as to whether all of the computing devices in the rack are turned off.

Figure 2:
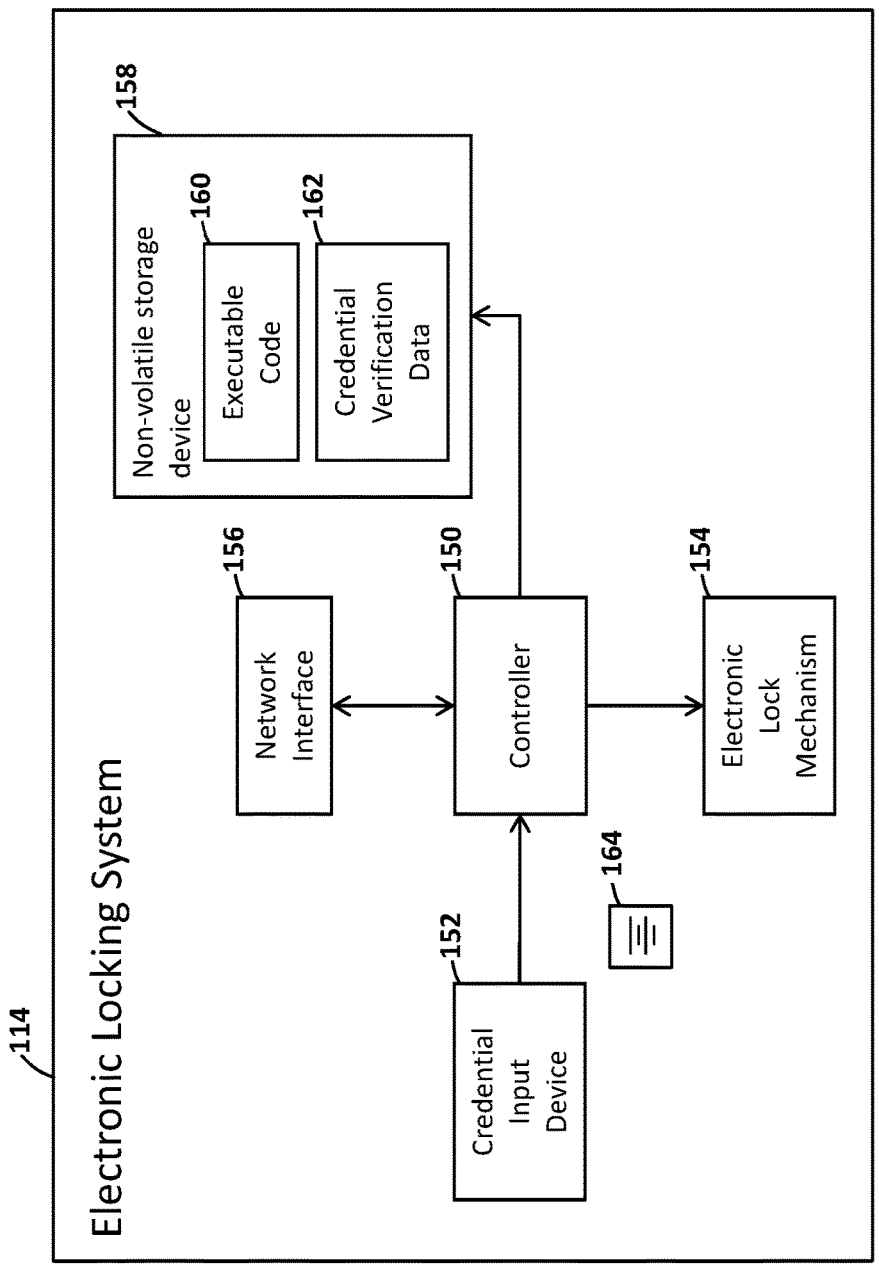
FIG. 2 shows a block diagram of an example of an electronic locking system in accordance with various examples.

Each equipment rack 102 also includes an electronic locking system 114, an example of which is shown in FIG. 2. As shown in FIG. 2, the electronic locking system 114 includes a controller 150, a credential input device 152, an electronic lock mechanism 154, a network interface 156, a non-volatile storage device 158, and a battery 164. The battery ensures that the electronic locking system is operational even if power to the rack is otherwise shut off. Additional or different components may be included as desired. The controller 150 may include a microcontroller that executes code 160 stored in the non-volatile storage device 158. Upon execution of such code 160, the controller 150 provides the electronic locking system 114 with the functionality described herein. The non-volatile storage device 158 may be separate from the controller 150 as shown, or included within the controller itself in other embodiments. The non-volatile storage device 158 may be solid state storage, battery-backed memory, etc.

The network interface 156 provides network connectivity between the electronic locking system 114 and, for example, the control plane 120. In particular, the electronic locking systems 114 may send communications to, and receive communications from, the maintenance controller 132. In one embodiment, the maintenance controller 132 may send credential verification data to each electronic locking system 114 for storage in the non-volatile storage device 158 of the electronic locking system 114 (stored as credential verification data 162). Such credential verification data 162 is used by the controller 150 to confirm that a valid credential has been provided by a human to the credential input device 152.

In other embodiments, logic in the control plane 120 may verify a credential submitted by a human to the credential input device 152. For example, the access controller 138 may receive a credential from the credential input device as submitted by a human. The credential verification data 162, for example, may be stored in, or otherwise be accessible to the access controller 138. The access controller 138 receives data indicative of the human-supplied credential from the credential input device 152 to the credential verification data 162. If a match is determined by the access controller 138, the access controller transmits a signal back to the controller 150 of the respective electronic locking system 114 to request the access door to be unlocked.

The credential input device 152 may be implemented as any of a variety of input devices such as a numeric or alphanumeric keypad, a biometric sensor, a magnetic card reader, etc. A human presents a valid credential to the credential input device 152 and the controller 150 compares the human-presented credential to the credential verification data 162. For example, if the credential input device 152 is a numeric keypad, the credential may be a personal identification number (PIN). The PIN entered by the human on the keypad is compared by the controller 150 to a set of valid of PINs stored as the credential verification data 162. If a match is detected, the controller 150 sends a signal to the electronic lock mechanism 154. If the credential input device 152 is a biometric sensor (e.g., fingerprint sensor, retinal scanner, etc.), the controller 150 compares the biometric data from the human to a valid set of biometric data in the credential verification data 162. The maintenance controller 132 programs the credential verification data 162 of the electronic locking systems 114 of the various equipment racks 102 with valid credential data of technicians or other personnel who have been registered with the service provider and have been screened and approved to access the electronic devices 106 housed within the equipment racks. For example, the maintenance controller 132 (or other control plane logic) may transmit updated credential verification data to each electronic logic system 114 when new credential verification data is available. In some embodiments, an electronic locking system 114 can request updated credential verification data from the maintenance controller 132. Such technicians may be responsible for performing maintenance activities within the data center.

As noted above, upon successful confirmation that a human has entered a valid credential into the credential input device 152, the controller 150 sends a signal to the electronic lock mechanism 154. The electronic lock mechanism 154 may be any type of electronically-controlled mechanism that can lock and unlock the access door 104 of the corresponding equipment rack 102. For example, the electronic lock mechanism 154 may be a magnetic lock, a solenoid-activated deadbolt lock, etc. The electronic lock mechanism 154 may include multiple states including a locked state in which the corresponding access door is locked and, when presented with a valid credential, an unlocked state which permits the corresponding access door to be opened.

Returning to FIG. 1, during normal operations the equipment racks 102 are populated with electronic devices 106, although not all equipment racks 102 are necessarily completely full of electronic components. The access doors of the equipment racks 102 are closed and locked. For example, upon installing or otherwise performing a maintenance action on an equipment rack 102, a human shuts the access door 104 of the rack. The act of shutting the door may cause the electronic locking system 114 to transition to the locked state. In other embodiments, the human may submit a valid credential to the credential input device 152, which causes the controller 150 to send a signal through the network interface 156 to the maintenance controller 132 which then returns a signal to the controller to cause the electronic locking system 114 to transition to the locked state to thereby lock the access door 104.

At some point in time, a determination may be made to perform a maintenance action on an equipment rack 102. The determination may be based on performance data and/or error data collected for the rack. For example, one or more of the electronic devices 106 may report a malfunction to the maintenance controller (e.g., memory errors, network packet timeouts, etc.). The rack's power supply may be operating erratically. The frequency of errors detected for an equipment rack 102 may exceed an acceptable threshold. By way of an additional example, the electronic components 106 in the rack may have reached an end of life service age and need to be retired (i.e., removed from service). Regardless of the reason, a decision may be made to perform a maintenance action on the rack. The maintenance action may include repairing one of the existing electronic devices 106, replacing an electronic device 106, adding additional electronic devices 106 to the rack, etc. Such actions may require direct physical contact to an electronic device 106 by a maintenance technician or other service provider personnel.

The nature of volatile memory (e.g., dynamic data random access memory, "DRAM") is that the data content of such memory generally is lost once power to the memory is removed. However, research has shown that residues or traces of data in DRAM can still be recovered for a short period of time after a computer system is powered off. Therefore, in accordance with the disclosed embodiments, physical access to the electronic devices 106 in an equipment rack is prevented for a predetermined threshold period of time after all electronic devices in the rack are powered off. That is, the access door 104 of a rack 102 remains locked while at least one electronic device 106 in the rack is powered on, and for a threshold period of time following the last of the electronic devices to be powered off. The electronic lock mechanism 154 of the electronic locking system 114 is caused to be transitioned to the lock state to lock the access door 104 for normal rack operations. Further, a message also can be sent by the access controller 138 of the control plane 120 to the electronic locking system 114 to disable the electronic locking system 114 of the rack from permitting the electronic lock mechanism 154 from unlocking even when the credential input device 152 is provided with a valid credential. The message from the access controller 138 may be received by the controller 150 of the electronic locking system 114 which may cause the controller 150 to ignore all input from the credential input device 152. Thus, even if a valid credential is provided by a human, the electronic locking system 114 will not respond and unlock the electronic lock mechanism 152. Thus, while an electronic device 106 in the rack is powered on, as well as for a threshold period of time following powering off of all computing devices in the rack, the rack's computing devices are inaccessible because the rack's electronic locking system 114 is disabled.

By precluding the access door from being opened for the threshold period of time following powering off of all electronic devices 106 in the equipment rack 102, whatever de minimis probability might have existed that data stored in the DRAM of a powered off electronic device might have been recovered is reduced even further (e.g., becomes 0 probability). In some embodiments, the threshold period of time is greater than or equal to 5 minutes, greater than or equal to 30 minutes, greater than or equal to one hour, etc.

The maintenance controller 132 may determine the need for a maintenance action, or a data center technician may determine the need for the maintenance action and inform the maintenance controller 132 that a particular equipment rack 102 should be powered down for maintenance. The maintenance controller 132 may respond by causing the customer notification service 136 to generate and send a notification to each customer who has a virtual machine executing in any of the electronic devices 106 of the equipment rack 102 to be maintained. The customer notifications may be in the form of emails, text messages, voice messages, etc. and inform the customer that his or her virtual machine is going to be shut down at a certain date and time in the future (e.g., tomorrow at 3 pm, July 12$^{th}$ at 6 pm, etc.). The notification gives the customer sufficient time, for example, to gracefully shut down the jobs being performed by the effected virtual machine, migrate the virtual machine to another electronic device 106 in a different rack 102, and restart the jobs on the newly migrated virtual machine. In some embodiments, the customer notification may indicate that, unless the customer otherwise indicates, the service provider will automatically migrate the customer's virtual machines from the equipment rack 102 to be shut down to a different equipment rack. The migration controller 134 may perform all migrations requested by the maintenance controller 132 and/or the customer. The migration may be a reboot migration in which the target virtual machine is first shut down, migrated to a different electronic device 106 in a different rack and then activated on the new electronic device 106, or a live migration in which the target virtual machine is migrated while remaining active and able to receive and process requests for the services provided by the virtual machine.

The maintenance controller 132 also alerts the access controller 138 that a particular equipment rack 102 is to be shut down. This alert may be sent to the access controller 138 after the virtual machines have been migrated to other racks or after a period of time afforded the customers to initiate the migration themselves. In response, the access controller 138 may send a message to the power controller 140 to begin shutting down the electronic devices 106 in the targeted equipment rack 102. The power controller 140 then may send configuration messages to each of the electronic devices 106 to cause them to power themselves off, or otherwise transition to a sleep, hibernate, or other low power mode. The power controller 140 also may send a signal to the power supplies (whether they are in the electronic devices 106 or in the equipment rack 102) to turn off electrical power to the electronic devices. In some embodiments, the electronic devices 106 may include circuitry (e.g., a chip) that implements the Advanced Configuration and Power Interface (ACPI) protocol, through which changes in power states can be implemented.

The access controller 130 also can monitor the power sensors 112 in each equipment rack 102 and, as such, can determine when a rack to be shut down has indeed had all of its electronic devices 106 powered off. When the signal from the power sensor 112 drops below a threshold level indicative of all electronic devices in the rack being powered off, the access controller 138 initiates a timer that counts from an initial count value to a terminal count value. The timer may be implemented in software in the access controller 138 or in hardware and may be a "count up" counter or a "count down" counter. The time also may be implemented in the controller 150 or other hardware or software of the electronic locking system 114 which then may receive a signal from the control plane 120 (e.g., access controller 138) to start the timer. The time difference between the initial and terminal count values is the threshold period of time after which the credential input device 152 of the electronic locking system 114 is enabled and thus the access door 104 to the rack can be opened. Further, the virtualization system that permits the virtual machines to execute may send a message to the access controller 138 that the hypervisor is shutting down. This message then may cause the access controller to begin monitoring the power sensor 112 or, in another embodiment, the access controller may be configured to receive messages (e.g., API requests) from power sensor 112 and use them as another data point in conjunction with the power sensors by access controller to determine that the rack is powered off.

When the timer reaches the terminal count value, the access controller 138 sends a signal to the electronic locking system 114 of the equipment rack 102 to cause the electronic locking system to cause its electronic lock mechanism 154 to unlock the access door upon receipt by the credential input device of a valid credential. In embodiments in which the timer is implemented in the electronic locking system 114, the expiration of the timer may cause the controller 150 to enable the ability to unlock the electronic lock mechanism 154. Once the electronic locking system is enable to permit the electronic lock mechanism 154 to unlock, a human can submit a valid credential to the credential input device 152 and the controller 150 will cause the electronic lock mechanism to unlock the access door 104. The access door then can be opened and the maintenance action can be performed.

In the embodiment above, the access controller 138 is configured to cause the electronic locking system 114 to disable its ability to unlock the access door even upon receipt of a valid credential. In another embodiment, the electronic locking system's controller 150 may be configured to authenticate a credential from the credential input device 152 and to submit a request through the network interface 156 to the access controller 138 for the access controller to grant permission to the electronic locking system 114 to unlock the access door. In this embodiment, the access controller will deny the request to unlock the access door even upon receipt by the electronic locking system 114 of a valid credential during normal rack operation as well as for a predetermined period of time following powering down of the rack. Upon expiration of the predetermined period of time, the access controller 138 will grant a request from the electronic locking system 114 to unlock the electronic lock mechanism 154, and thus the access door, upon receipt by the lock of a valid credential. Thus, in this embodiment any given attempt to open the unlock access door, which requires at least presentation of a valid credential to the credential input device 152, will require confirmation by the access controller 138, which will be denied by the access controller until the period of time expires following powering down of the rack.

In the event that communication is unavailable between the electronic locking system 114 and the access controller 138 (e.g., network problem, access controller 138 is temporarily off-line for maintenance, etc.), a request by the electronic locking system 114 to the access controller 138 to grant or deny unlocking of the access door may not be received. That is, the electronic locking system 114 may submit a request to the access controller 138, but no response is received, or the electronic locking system 114 may be unable to have its request received by the access controller. In either case, the electronic locking systems 114 may have a default state when it does not receive a grant or deny from the access controller to its request to unlock the access door. In one example, the default state may be that the electronic locking system 114 cannot unlock the electronic lock mechanism without regard to whether a credential is provided and verified. In another embodiment, the default state may be that the controller 150 will unlock the electronic lock mechanism if a credential is verified.

The threshold time period during which the time of the access controller 138 counts may be a fixed time period in some embodiments. In other embodiment, the threshold time may be programmable through a user interface to the access controller 138.

The embodiment shown in FIG. 1 includes equipment racks 102 whose access doors 104 are lockable with electronic locking systems 114. In some embodiments, the equipment racks 102 may have front and rear access doors which provide physical access to the front and rear panels respectively of the electronic devices 106 installed in the rack. Either or both of the front and rear access doors may be separately lockable, and such access doors may be disabled as described herein during normal operations and for the predetermined period of time following powering down of all devices in the rack. The principles described herein also may apply to other types of secure containment enclosures besides equipment racks in which electronic devices are housed. Secure containment enclosures include equipment racks (e.g., the racks 102 of FIG. 1), enclosures within equipment racks, closets, and other types of physical containment systems. For example, while access to the rack itself might not be secured, electronic devices may be housed in sub-rack enclosures that are installed in a rack and the sub-rack enclosure may have an access door which is locked as described above. A sub-rack enclosure is a physical enclosure structure that is installed in the rack and can accept multiple electronic devices 106. Multiple sub-rack enclosures may be installed in a single equipment rack.

Figure 3:
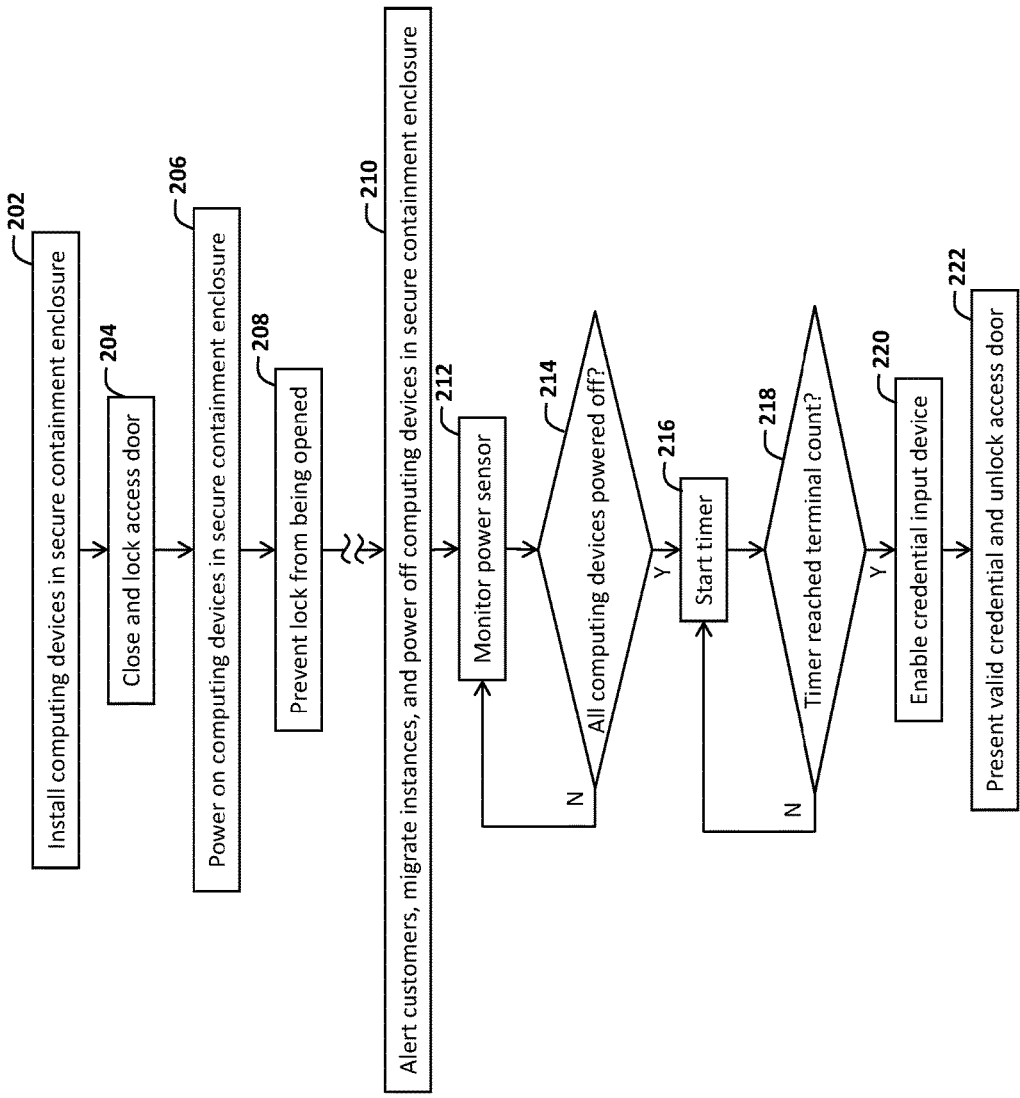
FIG. 3 shows a method usable to lock and protect secure containment enclosures in accordance with various examples.

FIG. 3 shows an example of a method in accordance with various embodiments. The operations shown in FIG. 3 may be performed in the order shown, or in a different order. Further, two or more of the operations may be performed concurrently rather than sequentially. At 202, the method includes installing computing devices in a secure containment enclosure (e.g., equipment rack 102). A technician may perform this operation by physically unpacking computing devices, such as server computers, and manually installing them in the secure containment enclosure. If the access door on the secure containment enclosure is closed, the technician will open the access door and then install the computing devices.

Once all of the computing devices have been installed in the secure containment enclosure, at 204, the technician then closes the enclosure's access door (e.g., access door 104) and locks it. Locking the access door may include simply shutting the door. In other scenarios, locking the access door may include the technician providing a valid credential to the credential input device 152 (e.g., a PIN, fingerprint scan, etc.), which the controller 150 of the electronic locking system 114 may confirm before activating the electronic lock mechanism 154 to lock the access door 104.

At 206, power to the computing devise in the secure containment enclosure is activated to power on the computing devices. This operation may be implemented by the technician informing the power controller 140 (e.g., via a user interface) that the access door of the secure containment enclosure has been closed and locked. In other embodiments, upon the controller 150 activating the electronic lock mechanism 154 to lock the access door, the controller 150 transmits a message through the network interface 156 to the power controller 140. However the power controller 140 is informed that it should proceed with powering up the computing devices in the secure containment enclosure, the power controller 140 initiates powering up the computing devices. In embodiments in which the secure containment enclosure has a power supply, the power controller 140 sends a signal to the power supply to provide operational power to the computing devices contained in the enclosure. The power supply may power up the computing devices concurrently or in a staged fashion to reduce the peak power demand.

At 208, the electronic locking system 114 is prevented from being opened without regard to whether a valid credential is provided. In some embodiments, the credential input device 152 is disabled. As the credential input device 162 is the only way for a human to open the access door to remove, touch, or connect or disconnect cables of the computing devices, disabling the credential input device prevents a human from being able to open the access door thereby preventing physical access to the computing devices in the enclosure. Disabling the credential input device may include the controller 150 ignoring all signals from the credential input device so that even if a human were to provide a valid credential to the credential input device, the controller 150 will not respond to unlock the electronic lock mechanism 154. In other embodiments, the credential input device 152 may have an enable/disable input connection and the controller 150 may disable the credential input device 152 by asserting the disable input of the credential input device. In yet other embodiments, the electronic locking system 114 is prevented from opening by the access controller 138 not granting a lock-open request submitted to it by the electronic locking system even if the electronic locking system has received and verified an input credential. For example, the access controller 138 may receive a lock-open request from the electronic locking system 114 and the access controller will return a deny message to the electronic locking system.

At this point, the secure containment enclosure is locked and operational. The access controller 138 can update a data store associated with provisioning system 130 indicating that the computing devices within the now locked containment enclosure can be used to provide resources to customers (e.g., to host virtual machines, storage volumes, etc.). At some point in the future, however, a decision may be made to perform a maintenance operation on the secure containment enclosure and/or one or more of its computing devices. The maintenance operation begins at 210 in FIG. 3. In operation 210, the method includes alerting customers whose virtual machines are in the secure containment enclosure that the computing devices on which their virtual machines are executing are going to be powered off, migrating instances as necessary, and begin powering off the computing devices. The alert may be initiated by the maintenance controller 132 which causes the customer notification service 136 to generate and transmit the notification as described above. The notification may include an identity of the particular virtual machine instances that are affected and the date and time at which the virtual machine's physical computing device will be shut down. For example, maintenance controller 132 can access a data store containing data indicating how the server fleet is being used by customers. The maintenance controller 132 can submit a query with the identifier of the rack or racks that are going to have maintenance performed thereon. The maintenance controller 132 can then identify the customers associated with the virtual machines on the racks and send notifications to addresses associated with the customers. The customer may terminate his or her virtual machine or may manually initiate a migration of the virtual machine to a different computing device in a different secure containment enclosure. The provisioning system 130 may be informed of the maintenance operation on the secure containment enclosure and thus will not attempt to place new virtual machines in that enclosure until the maintenance operation is completed. The maintenance controller 132 also may send a message to the migration controller 134 to migrate any instances that customers have not shut down or migrated themselves. At the scheduled time (indicated in the notification to the customer), the power controller 130 initiates a power shut down of the computing devices in the secure containment enclosure. Powering off the computing devices may be initiated by the power controller 140 sending a signal to the power supply of the secure containment enclosure to disable power to the computing devices of the enclosure.

At 212, the access controller 138 monitors the power sensor in the secure containment enclosure (e.g., the power sensor 112 in the equipment rack 102 of FIG. 1). The power sensor indicates whether and/or how much power is being consumed by the computing devices of the enclosure. The access controller 138 determines when the power sensor's signal drops below a threshold indicative of all computing devices being powered off. Alternatively, the power sensor may include logic that can determine when its sensor's signal drops below a threshold and send a message indicating such to the access controller 138. In either embodiment, the decision is reflected by decision block 214. If the access controller 138 or power sensor 112 determines that not all computing devices are powered off, control loops back to operation 212 and the sensor of the power sensor is continued to be monitored. Eventually, the access controller determines that all computing devices in the secure containment enclosure have been powered off. Upon that determination being made, a timer is started at 216. The timer may be implemented as part of the access controller 138, may be a separate service accessible to the access controller, or may be implemented in the electronic locking system 114. The timer may count up or down and has an associated terminal count value as explained above.

When the timer reaches the terminal count, as determined by the access controller 138, the credential input device is enabled at 220. This operation may be implemented by the access controller 138 sending a message to the controller 150 of the electronic locking system 114. The controller may respond to the message by enabling the credential input device. In some examples, the controller 150 had been ignoring input from the credential input device 152 and now begins to accept and process input from the credential input device 152. In other examples, the controller 150 asserts and enable signal to the credential input device 152 to power on the input device. In other examples, the credential input device 152 may always be enabled, but the controller 150 or access controller 138 will deny requests to open the electronic lock unless there is a signal indicating that power to the secure containment enclosure has been off for the terminal count period. At this point, then at 222, the method includes receiving, by the credential input device 152 a valid credential to the credential input device 152 and unlocking the access door 222. The controller 150 may validate the credential presented to the credential input device 152. Once the access door is unlocked, the door can be opened by a human to physically access the computing devices of the secure containment enclosure. As long as the door is open, the system (e.g., the access controller 138 or power controller 140) will not permit power to be supplied to the servers.

Figure 4:
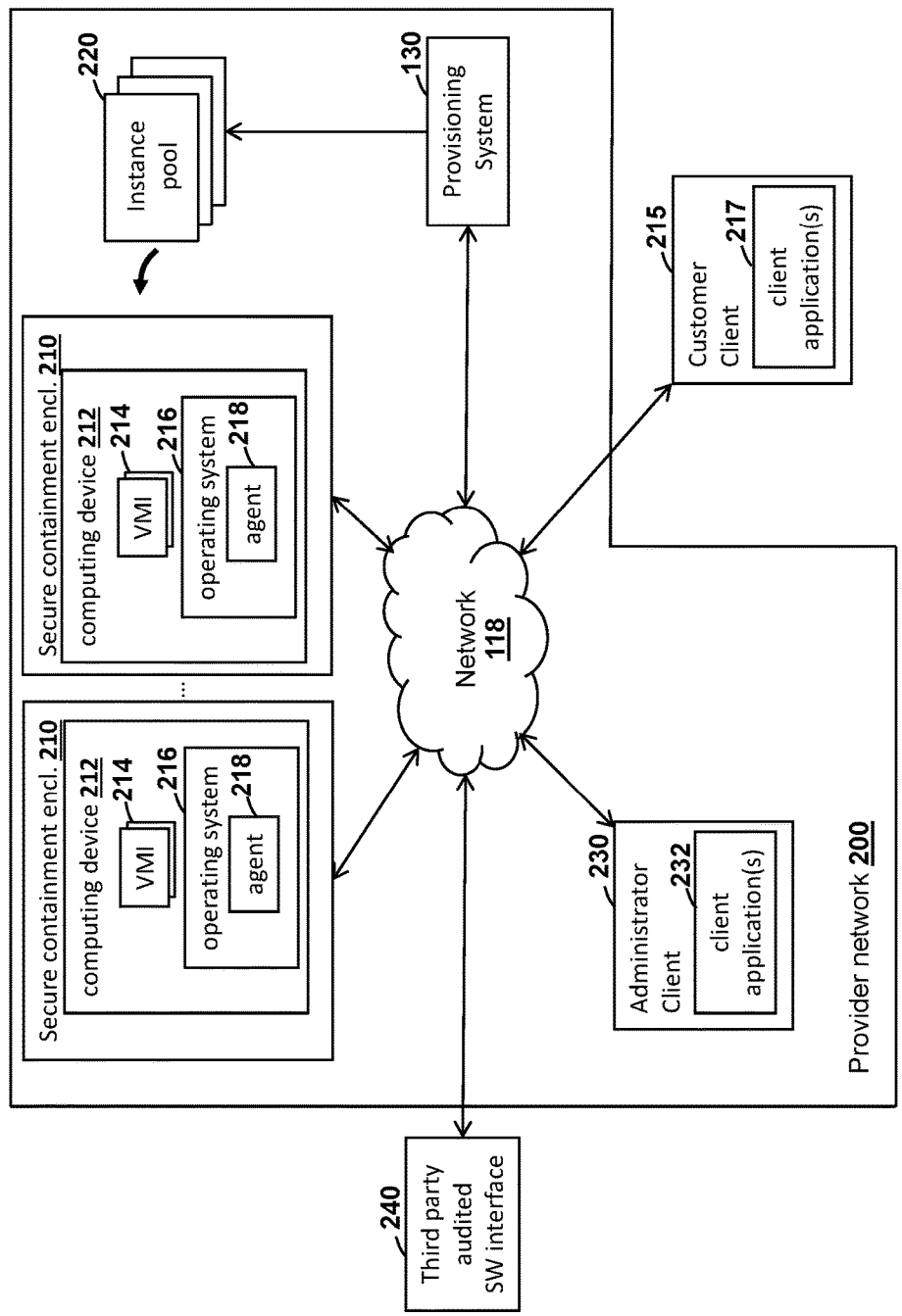
FIG. 4 shows another illustrative system which provide additional security features in accordance with various examples.

FIG. 4 shows an example of an embodiment of a service provider network 200 including multiple secure containment enclosures 210 (e.g., equipment racks, sub-rack enclosures, closets, etc.), instance pools 220, the provisioning system 130, and an administrator client 230. Different or other components may be included as well in the illustrative provider network 200. Each secure containment enclosure 210 may include one or more computing devices 212 such as server computers, switches, a routers, etc. At least some of the computing devices 212 illustrated in FIG. 4 can execute one or more virtual machine instances (VMI) 214 and a host operating system 216. An executable agent 218 also is shown as part of the operating system 216 and is discussed below.

Customer clients 215 may be computing devices such as personal computers, tablet devices, smart phones and the like through which customers are able to submit requests, for example, for creating, monitoring, managing, and retiring VMIs. The customer client 215 may include one more client applications 217 such as web browsers which provide the customer access to web applications that execute in the provider network. Functionality attributed herein to the customer client 215 includes the underlying hardware (e.g., central processing unit ("CPU"), memory, etc.) executing and supporting the client applications 217.

Pools of servers can be configured to host different types of VMIs that may be associated with instance pools 220. Such pools may include servers configured to host on-demand instances, reserved instances, and spot instances, although other types of instances may be provided as well. Each instance pool 220 may have different pricing policies and other characteristics. For instance, a reserved instance pool includes servers operable to host VMIs that may be reserved by customers for fairly long periods of time (e.g., 1 year, 3 years, etc.) by paying a low, one-time, upfront payment for the instance, and then paying a low hourly rate for actual use of the instance at any desired times during the term of the reservation. By way of an additional example, an on-demand instance may allow customers to pay for resource capacity by the hour as needed with no long-term commitment or upfront payments. Further, instances in a spot instance pool have prices that may vary with supply and demand effects. Instances from a spot instance pool can be purchased for a guaranteed maximum price in that the customer specifies the maximum price (the "bid price") that the customer is willing to pay. If the bid price equals or exceeds the current spot price for a desired instance, the instance is activated and assigned for exclusive use by the customer. Thus, the customer knows the upper limit that he will have to pay for a given spot instance. However, spot instances are interruptible in that the spot price may eventually exceed the bid price. If and when that happens, the spot instance is terminated from use by the customer.

The provisioning system 130 receives requests from a customer client 215 to, for example, create a virtual machine. The provisioning system 130 honors any requirements included in the customer request such as a type of virtual machine (e.g., amount of memory, number of CPUs, etc.), geographical region and/or availability zone of a data center to host the virtual machine, pricing policy requested by the customer, etc. The provisioning system 130 selects one or more slots (e.g., spaces on servers operable to host virtual machine instances) from among the instance pools 220 that correspond to the requirements of the customer's request and launches, or causes to be launched, the virtual machines on a computing devices 212. The provisioning system 130 may select a particular computing device based on such factors as available capacity, geographic location, instance type, etc., as well as a goal not to place more than a particular number or threshold percentage of virtual machines 214 in a given secure containment enclosure 210. For this latter factor, the service provider may not want to load a given secure containment enclosure more than, for example, 85% of its computing devices' total capacity to accept virtual machines. Loading a given secure containment enclosure to a level less than 100% of its total capacity decreases the number of virtual machines that would be detrimentally affected by a malfunction of a secure containment enclosure 210. The provisioning system 130 may consider different or additional factors as well when selecting a computing device 212 of a particular secure containment enclosure 210 to host a virtual machine.

In addition to the security provided by locked secure containment enclosures that cannot be unlocked during normal operations nor for a threshold period of time following powering down of the computing devices contained within the enclosure, additional security can be provided through the implementation of shared dedicated instances. A "dedicated" instance is a virtual machine that is hosted on a computing device in which no other customers' instances are also hosted. The customer therefore is assured of single tenancy on the physical computing device. Although the potential for a virtual machine of one customer accessing another virtual machine and its resources on the same computing device is very low, by dedicating the use of computing device to a single customer's virtual machines, the potential for cross-virtual machine contamination is reduced even further. In accordance with an illustrative embodiment, the provider network 200 provides the ability to customers to designate a group of customer accounts that can share dedicated instances. As such, the provisioning system 130 can locate virtual machines created under multiple accounts owned by the same customer on a common computing device 212. Further, virtual machines of different customers can be co-located on the same computing device if designated in advance by the various customers.

For example, two service provider customers may be a manufacturer and a supplier with the supplier providing materials to the manufacturer for use in fabricating the manufacturer's products. If the manufacturer trusts the supplier and vice versa, they can agree to have their instances execute on the same computing device(s). By permitting a customer to specify another customer account with which the customer is willing to share a computing device, the customer can be afforded a higher degree of security. By sharing the computing device(s) to exclusively execute only virtual machine instances owned by just those two customers, additional security is provided to those customers. Each customer can submit an application programming interface (API) call to launch its virtual machines (or interact with a graphical user interface) and the API call may include as a parameter a flag that indicates that the virtual machines of that customer are to be launched on a physical computing device dedicated for use for only that customer and another particular customer identified by way of the flag (e.g., a customer name or other type of identifier). The provisioning system 130 places the instances on a common computing device 212 in accordance with cotenancy requirements specified, for example, in the API calls.

To launch and manage instances in a provider network, commands may be sent from the control plane 120 (e.g., from an administrator client 230 as illustrated in FIG. 4) to the hypervisor and/or dom0 on the computing device 106 to carry out various administrative actions. Examples of such actions may include starting the instances by loading or booting a storage volume, stopping the instance running as dom3, stopping or deleting the instance running as dom10, etc. In addition, agent software ("agents") 218 may run on both the dom0 as well as user domains (e.g., guest instances), to send information such as user statistics and status from the computing device 106 to the control plane 120. In one example, the control plane may send a command to a hypervisor to shut down a guest operating system. The hypervisor may respond by shutting down the guest operating system as requested and then send a message back to the control plane that the instance has stopped. In general, various software interaction may occur between the control plane 120, the hypervisor/dom0 and the guest instances.

In some cases, the dom0 provides an interactive login (such as a SSH agent) to permit a human (e.g., a service provider technology specialist) to do various things such as making a dump of the memory assigned to an instance, inspecting the memory live, etc. In some embodiments, automated virtual machine instances can be created and executed on computing devices 212. An automated instance is an instance for which such interactive login-in access by a human (e.g., from an administrator client 230) to the physical computing device (e.g., to the dom0) executing the instance has been eliminated or deactivated. For instance, while some operating systems and/or hypervisors may have an administrative login capability, such administrative login capabilities may not exist in an automated instance. In such implementations, a human cannot log in to the physical computing device using the administrative login access because such access does not exist. An automated instance, however, may still permit the hypervisor and instances to receive and process commands to perform the administrative actions necessary to create and manage the instances (e.g., starting an instance, stopping an instances) as noted above. Such administrative actions may be documented by way of third party code audits (e.g., via third party audited software interface 240) such that service provider customers can be assured that no service provider personnel can access their unencrypted data in the memory of the guest operating systems, nor in any input/output data path to or form the guest operating system (prior to encryption). In some embodiments, the administrative login capability exists but a given administrator's ability to log in is disabled via a policy that is local to the dom0. In this case, the SSH agent has been modified to check a policy as to when it can allow administrative access versus when it cannot allow such access. If a customer instance is tagged with an indicator that access is not allowed (for example, this data could be instance metadata or the like), the SSH agent will detect the flag, read the policy, and deny any administrative log in requests.

Instead of, or in addition to, the security provided by the embodiments described above, security can be further heightened through the use of encryption. In one embodiment, disk encryption is provided through which all access to storage such as block storage mapped to a virtual machine instance throughout its lifetime is encrypted. Such encryption may include encrypting data on a boot drive and all mounted block storage volumes. In some embodiments, disk encryption is an "always on" feature which is enabled via an API flag by a customer when launching a virtual machine and/or block storage to be used by the virtual machine. Boot volumes as well as non-boot volumes can be encrypted. Further, by stopping or terminating the instance and associated block storage volumes, and suspending or deleting the associated encryption key(s), some or all persistent data associated with the instance is wiped (e.g., erased, rendered inaccessible, etc.) and thus rendered unavailable.

Figure 5:
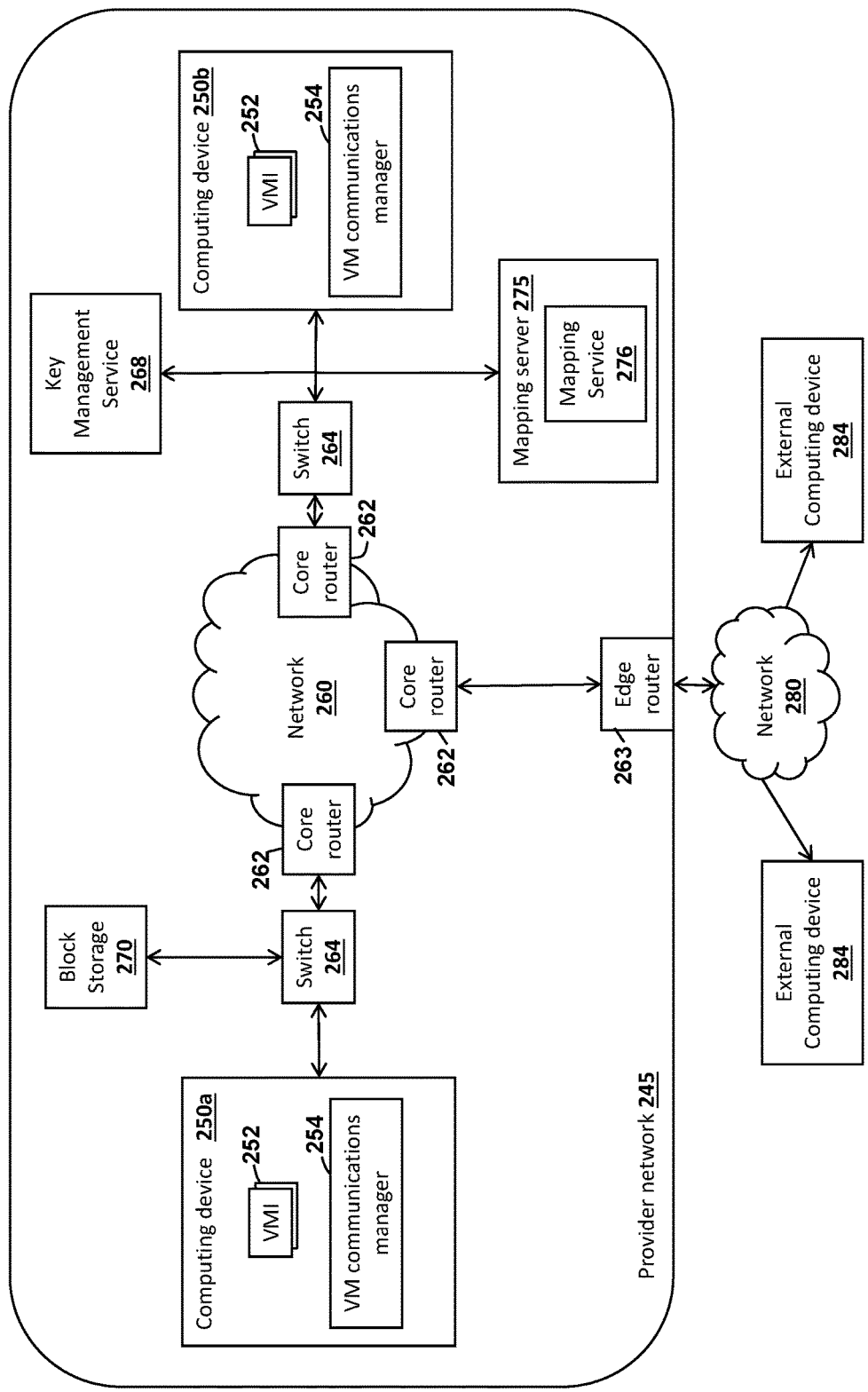
FIG. 5 shows a block diagram of a provider network which implements a virtual overlay network and block storage and network encryption in accordance with at least some embodiments.

FIG. 5 illustrates a provider network 245 accessible by external computing systems 284 through an external network (e.g., the Internet) 280. One or more edge routers 263 may provide connectivity between the devices internal to the provider network 245 and the network 280 and external computing devices 284. The provider network includes multiple physical computing devices (e.g., computing devices 250*a* and 250*b*) coupled together via a network 260 which includes core routers 262 and other networking devices. Physical computing devices 250*a/b* are coupled to core routers 262 through switches 264. Each physical computing device 250*a/b* may execute one or more virtual machines 252 as explained above.

During launch time of a virtual machine 252, or subsequently, the virtual machine may be mapped to a storage volume of a block storage 270. The block storage 270 provides mass storage (e.g., magnetic storage such as hard disk drive, solid state storage, etc.) to be used by the virtual machines 252 in the provider network 245. In some embodiments, block storage 270 may comprise one or more storage devices that are housed in a secure containment enclosure (e.g., a rack) such as that described herein. As such, a human can physically access block storage 270 during normal use of the block storage as well as for a period the predetermined period time following powering down of the secure containment enclosure in which the block storage is housed. The data stored on in the block storage volume mapped to a particular virtual machine may be encrypted as explained above. In some embodiments, data stored on block storage 270 may be encrypted before it is provided to the block storage for storage. In that embodiment, the block storage 270 receives and stores encrypted data for write operations, and retrieves and returns encrypted data during read operations—no plaintext data is received by the block storage in some embodiments. In other embodiments, the block storage 270 may include an encryption/decryption engine that receives plaintext data, encrypts the data, and stores the newly encrypted data. Upon receipt of a read request, the block storage decrypts the data and then returns plaintext data back to the read requester. Some virtual machines 252 may implement always on disk encryption, while other virtual machines may not implement always on disk encryption. Responsibility for encrypting and decrypting the data stored in the block storage 270 may rest with the block storage itself. In other embodiments, the virtual machines may encrypt the data to be stored in the block storage and decrypt all data read from the block storage.

In yet other embodiments, the provider network may implement "always on network encryption" for packets transmitted within the provider network. That is, packets between two instances owned by a customer are encrypted. Such network encryption may be implemented in the context of a virtual overlay network. The provider network 245 may implement the virtual overlay network on the physical network. In the overlay network (also termed a "virtual" network), instances exchange packets (and external computing systems can exchange packets with the instances) using virtual addresses. The instances, however, are physically addressed with physical IP addresses and thus mappings between virtual and physical addresses are maintained. In some embodiments, communications to and/or from virtual machines 252 and physical computing devices 250 are provided on the virtual overlay network. The virtual overlay network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used. For example, the packet generated by the virtual machine could be fragmented and inserted into an IPv4 packet or be of a smaller size. Each physical computing device 250a/b has a virtual machine (VM) communications manager 254 to assist with the implementation of the overlay network.

The virtual IP addresses can be IP addresses selected by the customer for his or her private virtual network, and different customers may use the same virtual IP addresses for different private virtual networks. When a virtual machine forms a packet to be sent to another virtual machine of the customer's private virtual overlay network, the mapping service 275 shown in FIG. 4 may be used to validate the virtual IP addresses for that particular customer. For example, the mapping service 275 may validate that the destination IP address belongs to the customer. Virtual communications manager 254 running in the computing device hosting the virtual machine intercepts the packet and communicates with the mapping service 276 to obtain the mappings between the virtual source and destination IP addresses and the corresponding physical source and destination IP addresses.

For example, a virtual machine 252 in the source physical computing device 250a may attempt to send a packet to a virtual machine in the destination physical computing device 250b. The source virtual machine forms the packet to include its virtual source IP address and the virtual destination IP address of the destination virtual machine in the physical computing device 250b. The VM communications manager 254 of the source physical computing device 250a intercepts the outgoing packet, and requests the address mapping from the mapping service 276 executing on the mapping server 275. The mapping service 276 responds with the virtual-to-physical IP address mappings which can then be stored in cache memory by the VM communications manager 254 for subsequent use (so that another request for the address mappings to the mapping service 276 is not needed).

The VM communications manager 254 then may encapsulate the packet generated by the source virtual machine instance 252 to include, for example, a header with physical source and destination IP addresses that correspond to the packet's original virtual source and destination IP addresses. The encapsulated packet then can be transmitted through switches 264, edge routers 262, and network 260 to the destination physical computing device 250b. The VM communications manager 254 in the destination physical computing device 250b may intercept the incoming packet, remove the headers added by the VM communications manager 254 of the source physical computing device 250a and containing the physical source and destination IP addresses and provide the resulting original message (with headers containing the virtual source and destination IP addresses) to the destination virtual machine instance 252.

In some embodiments, the hypervisor that interacts with the virtual machine instances may encrypt packets before the packets leave the physical computing device. A key management service 268, which may execute on a computing device, may be provided to generate and store encryption keys used during the encryption and decryption processes. Each virtual overlay network may have be assigned its own encryption keys by the key management service 268, that is, the encryption keys for a given virtual overlay network are used exclusively only by that particular virtual overlay network, and no other virtual overlay networks. The keys may be symmetrical keys (same key used for encryption and decryption) or asymmetrical keys (encryption key is different than decryption key). The mapping service 276 may transmit requests to the key management service 268 to generate and/or retrieve encryption keys for use by the computing devices 250 and/or the virtual machine instances 252 running thereon to encrypt and decrypt packets on a particular virtual overlay network. For example, the mapping service 276 may validate that a source virtual machine instance attempting to send a packet to a destination virtual machine instance are part of the same virtual overlay network, in which case the mapping service may submit a request to the key management service 268 to provide keys associated with that particular virtual overlay network to the source and destination virtual machine instances. The source virtual machine instance may encrypt the packet using the key provided to it by the key management service 268, and upon receipt by the destination virtual machine instance, the destination virtual machine instance may decrypt the packet using its key management service-provided key. In some embodiments, the virtual machine instances encrypt/decrypt the packets using the keys, while in other embodiments, the virtualization system (e.g., the hypervisor, DOM0, etc.) that creates and implements the virtual machine instances on a computing device performs the packet encryption/decryption using the keys.

Figure 6:
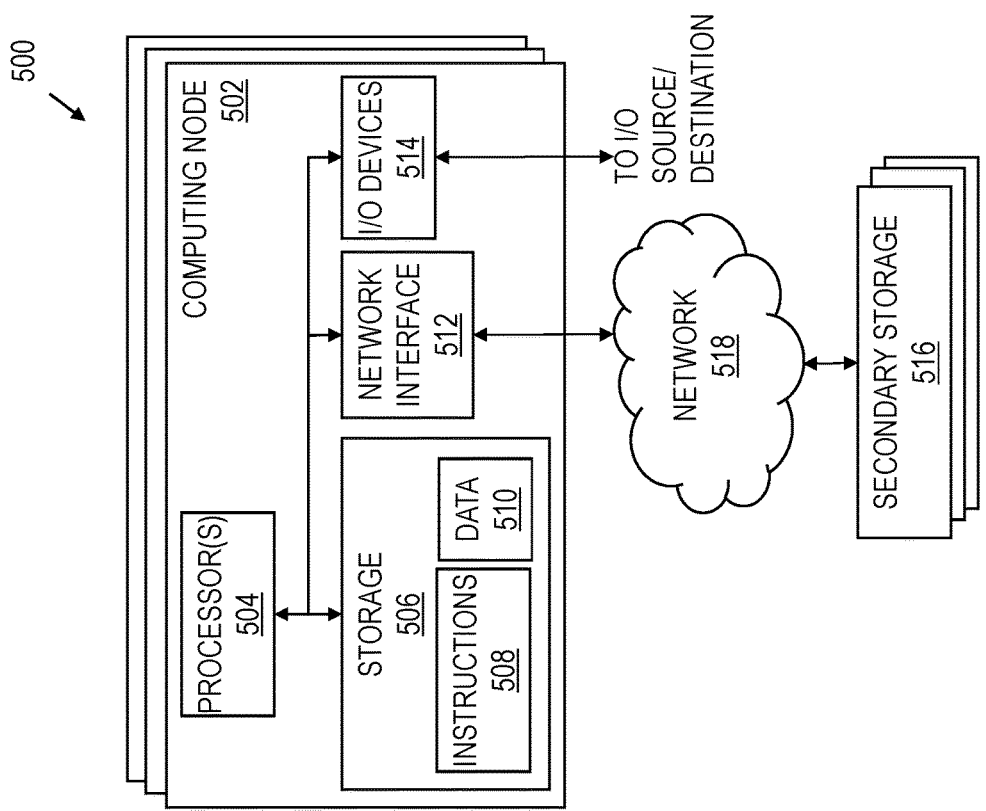
FIG. 6 is a block diagram illustrating an example computing node that may be used in some embodiments.

FIG. 6 shows a schematic diagram for a computing system 500 suitable for implementation of one or more of the components of the provider networks (e.g., provider network 100, 200) as well as other components described herein, including the functionality to lock secure containment enclosures during normal operation as well for a threshold period of time following powering down of the components of the enclosure. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the provisioning system 130, the maintenance controller 132, the migration controller 134, the customer notification service 136, the access controller 138, the power controller 140, the third party audited software interface 240, the customer client 215, the administrator client 230, the mapping server 275, the virtual machine communications managers 254, and some or all other devices/services described herein.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or ISAs, or any other suitable ISA. In multiprocessor systems, each of processors 504 may, but not necessarily, commonly implement the same ISA. Similarly, in a distributed computing system such as one that collectively implements the components described herein, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the provisioning system 130, the maintenance controller 132, the migration controller 134, the customer notification service 136, the access controller 138, the power controller 140, the third party audited software interface 240, the administrator client 230, and the customer client 215 and all other components described herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the resource manager 180 and interface manager 183 may be implemented as a separate computing node 502 executing software to provide the computing node with the functionality described herein. In some embodiments, the provisioning system 130, the maintenance controller 132, the migration controller 134, the customer notification service 136, the access controller 138, the power controller 140, the third party audited software interface 240, the administrator client 230, and the customer client 215 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in sonic embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the disclosed examples. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of equipment racks, each equipment rack including enclosures to receive server computers, and each equipment rack including an access door, and each access door including an electronic locking system configured to selectively lock and, based at least in part on receipt of a valid credential, unlock the corresponding access door;
   a computing device operable to execute an access controller configured to cause each electronic locking system to prevent unlocking its rack's respective access door even upon receipt by the electronic locking system of a valid credential while a server computer in the rack is powered on as well as for a predetermined period of time following powering off of all server computers in the rack and to permit the electronic locking system to unlock the access door upon receipt of a valid credential upon expiration of the predetermined period of time.

2. The system of claim 1, wherein the access controller is configured to start a timer upon receipt of an indication that all server computers in the rack have been powered down.

3. The system of claim 1, wherein the predetermined period of time is greater than or equal to 5 minutes.

4. The system of claim 1, wherein:
   each server computer is configured to execute a virtualization system, the virtualization system configured to send a signal to the access controller that at least a portion of the virtualization system is shutting down;
   each equipment rack includes a power sensor; and
   the access controller is configured to start a timer for the predetermined period of time upon determining from a rack's power sensor that power to the rack is turned off and that a signal indicating at least a portion of the virtualization system is shutting down has been received.

5. A system, comprising:
   a plurality of secure containment enclosures, each secure containment enclosure configured to receive computing devices, and each secure containment enclosure including an access door and an electronic locking system to lock and unlock the access door;
   a computing device operable to execute an access controller configured to enable and disable the electronic locking systems of the rack access doors; and
   wherein the access controller is configured to prevent the electronic locking systems from opening while a computing device within the secure containment enclosure is powered on, as well as for a threshold period of time following powering off of all computing devices in the rack.

6. The system of claim 5, wherein each electronic locking system includes a credential input device and a lock mechanism, wherein the credential input device, when presented with a valid credential, causes the lock mechanism to unlock the access door, and wherein the access controller is configured to prevent an electronic locking system of a secure containment enclosure from opening by causing a signal to be sent to the electronic locking system to cause the electronic locking system to fail to unlock the lock mechanism even when a valid credential is provided to the credential input device.

7. The system of claim 5, wherein each electronic locking system includes a credential input device and a lock mechanism, wherein the credential input device, when presented with a valid credential, causes the lock mechanism to submit a request to the access controller for permission to open the electronic locking system, and wherein the access controller is configured to deny the request before expiration of the threshold period of time.

8. The system of claim 5, wherein the secure containment enclosure further includes:
   a power supply configured to provide power to the computing devices of the secure containment enclosure; and
   a power sensor configured to detect whether any electrical power is being provided to the computing devices of the secure containment enclosure; and
   wherein the access controller is configured to start a timer upon receipt of a signal from a secure containment enclosure that the power sensor detects all electrical power is off to the computing devices of that secure containment enclosure.

9. The system of claim 8, wherein the access controller sends a signal to the electronic locking system of a secure containment enclosure upon the timer for that secure containment enclosure reaching a terminal count value to cause the electronic locking system to unlock the access door upon receipt by the electronic lock of a valid credential.

10. The system of claim 5, further comprising a computing device operable to execute a provisioning system configured to dedicate a server computer to execute virtual machine instances of multiple provider network accounts in response to a request to have such virtual machine instances dedicated to a common server computer.

11. The system of claim 5, a computing device includes an operating system configured to execute a virtual machine, and wherein the operating system includes an agent configured to provide a third party audited software interface and wherein the operating system does not include an active logon for administrator access.

12. The system of claim 5, further comprising a storage subsystem that is configured to provide block storage for virtual machine instances executed on a computing device, wherein the storage subsystem provides a boot drive and data volumes to be mounted by particular virtual machine instances, and wherein all data on the boot drive and data volumes mounted by the virtual machine instances are encrypted.

13. The system of claim 5, further comprising computing devices configured to implement a mapping service and a key management service, wherein the mapping service is configured to provide mappings between virtual machine instances and corresponding virtual overlay networks and to request encryption keys corresponding to a virtual overlay network to be provided from the key management service to computing devices that execute the virtual machine instances of the virtual overlay network for encryption and decryption of packets routed across a network between the virtual machine instances of the virtual overlay network.

14. A method, comprising:
   causing an electronic locking system of a secure containment enclosure to lock an access door of the secure containment enclosure containing at least one electronic device;

disabling the electronic locking system from unlocking the access door;

based on a signal from a power sensor in a secure containment enclosure, determining that all electronic devices in the secure containment enclosure are in a low power state;

starting a timer to count for a predetermined period of time;

upon reaching the predetermined period of time, enabling the electronic locking system to be unlocked.

15. The method of claim 14, wherein after enabling the electronic locking system to be unlocked, receiving a valid credential to a credential input device and unlocking the electronic locking system.

16. The method of claim 14, wherein disabling the electronic locking system includes verifying a credential and submitting a lock-open request by the electronic locking system across a network to a computing device.

17. The method of claim 16, further comprising:

upon receiving a lock-open grant message in response to the lock-open request, unlocking the electronic locking system;

upon receiving a lock-open deny message in response to the lock-open request, maintaining the electronic locking system in a locked state; and upon failure to receive a response to the lock-open request, unlocking the electronic locking system.

18. The method of claim 14, wherein disabling the electronic locking system from being unlocked includes failing to unlock an electronic lock mechanism even upon receipt by a credential input device of the electronic locking system of a valid credential.

19. The method of claim 14, further comprising executing a virtual machine on an electronic device in the secure containment enclosure, and monitoring the power sensor upon receipt by a hypervisor on the electronic device is shutting down.

20. The method of claim 14, further comprising migrating a virtual machine instance executing on the electronic device and then shutting off power to the electronic device before starting the timer.

* * * * *